United States Patent
Olomski

(10) Patent No.: US 7,826,928 B2
(45) Date of Patent: Nov. 2, 2010

(54) COMPUTER-SUPPORTED DETERMINATION METHOD FOR SUPPLEMENTARY POSITION SET VALUES FOR A POSITION GUIDED MOVING SUPPLEMENTARY ELEMENT OF A MACHINE IN PARTICULAR A PRODUCTION MACHINE

(75) Inventor: Jürgen Olomski, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 998 days.

(21) Appl. No.: 11/597,314

(22) PCT Filed: May 18, 2005

(86) PCT No.: PCT/EP2005/052293

§ 371 (c)(1),
(2), (4) Date: Nov. 21, 2006

(87) PCT Pub. No.: WO2005/116784

PCT Pub. Date: Dec. 8, 2005

(65) Prior Publication Data

US 2007/0233290 A1 Oct. 4, 2007

(30) Foreign Application Priority Data

May 24, 2004 (DE) .................. 10 2004 025 416

(51) Int. Cl.
G05B 19/18 (2006.01)
G05B 19/4061 (2006.01)

(52) U.S. Cl. .................. 700/255; 700/56; 700/112; 700/228; 700/247; 700/253; 701/301; 425/135; 425/139; 425/165; 318/568.11; 264/334; 414/225.01

(58) Field of Classification Search .................. 425/165, 425/139, 436 RM
See application file for complete search history.

(56) References Cited

U.S. PATENT DOCUMENTS

| 4,732,554 | A | * | 3/1988 | Hellmann | 425/139 |
| 5,250,239 | A | * | 10/1993 | Herbst | 264/40.5 |
| 5,295,802 | A | * | 3/1994 | Hersbt | 425/139 |
| 5,518,387 | A | * | 5/1996 | Di Simone | 425/139 |
| 5,629,031 | A | * | 5/1997 | Ishikawa et al. | 425/139 |
| 5,906,777 | A | * | 5/1999 | Kamiguchi et al. | 264/40.1 |
| 6,322,733 | B1 | * | 11/2001 | Herbst | 264/40.5 |
| 6,325,955 | B1 | * | 12/2001 | Herbst | 264/40.5 |
| 6,409,945 | B1 | * | 6/2002 | Yamamoto | 264/40.1 |
| 2004/0005372 | A1 | * | 1/2004 | Shirahata et al. | 425/135 |

FOREIGN PATENT DOCUMENTS

DE 40 03 372 C1 7/1991

(Continued)

Primary Examiner—Thomas G Black
Assistant Examiner—Lin B Olsen

(57) ABSTRACT

A control device for controlling the movement of a machine determines a base position set value according to a given base track in space. By limitation of a base element of a machine therewith, the above is hence positionally moved along a base track. The control device further determines a corresponding current supplementary end position in space using the base position set value. The control device also determines a supplementary position set value from a given fixed supplementary start position in space and the current supplementary end position. By limitation of a supplementary element of the machine thereto, the above is thus displaced along an current supplementary track from the supplementary start position, to the current supplementary end position.

14 Claims, 4 Drawing Sheets

FOREIGN PATENT DOCUMENTS

| | | |
|---|---|---|
| EP | 0 997 257 A1 | 5/2000 |
| JP | 60138611 A | 7/1985 |
| JP | 11104900 A | 4/1999 |
| JP | 2000284817 A | 10/2000 |
| JP | 2002059465 A | 2/2002 |
| WO | WO 03/082544 A1 | 10/2003 |

* cited by examiner

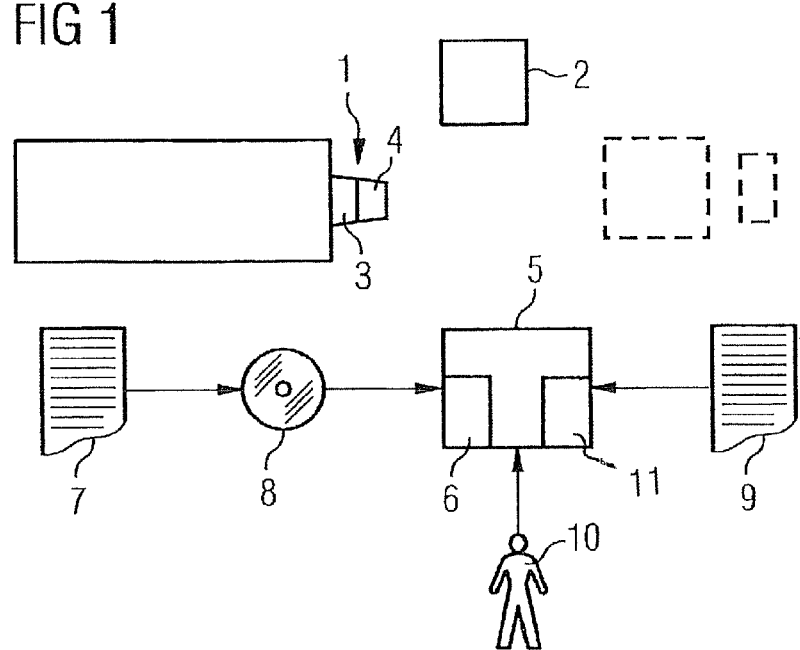
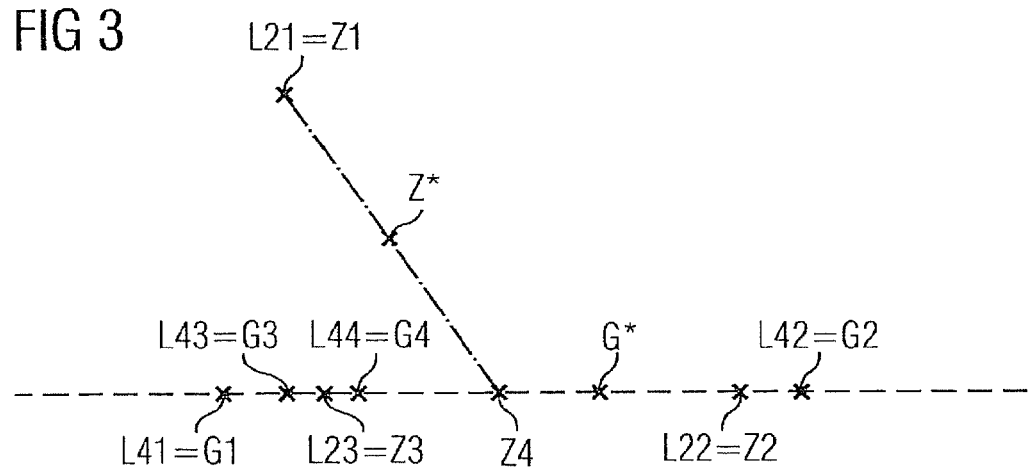

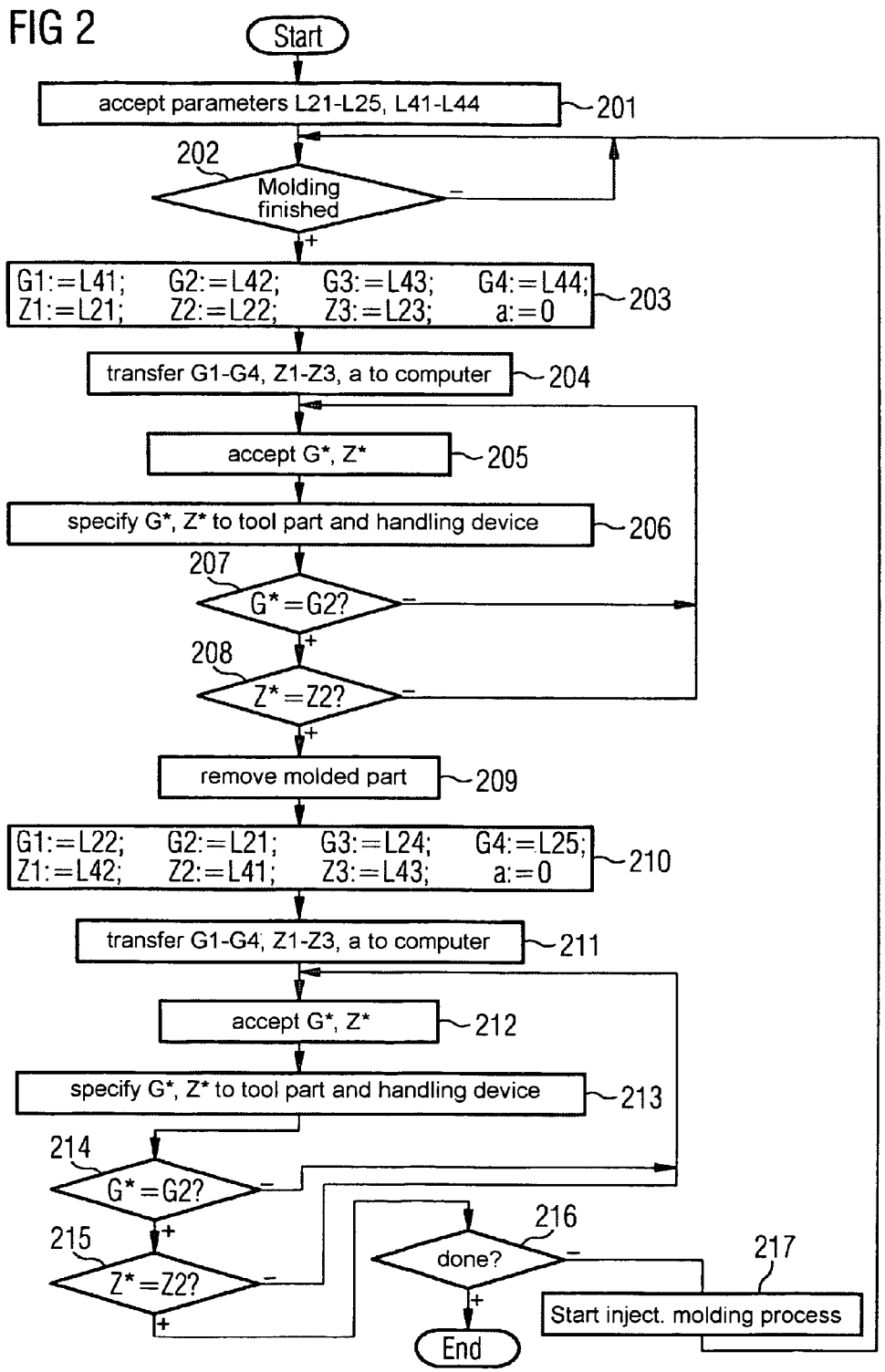

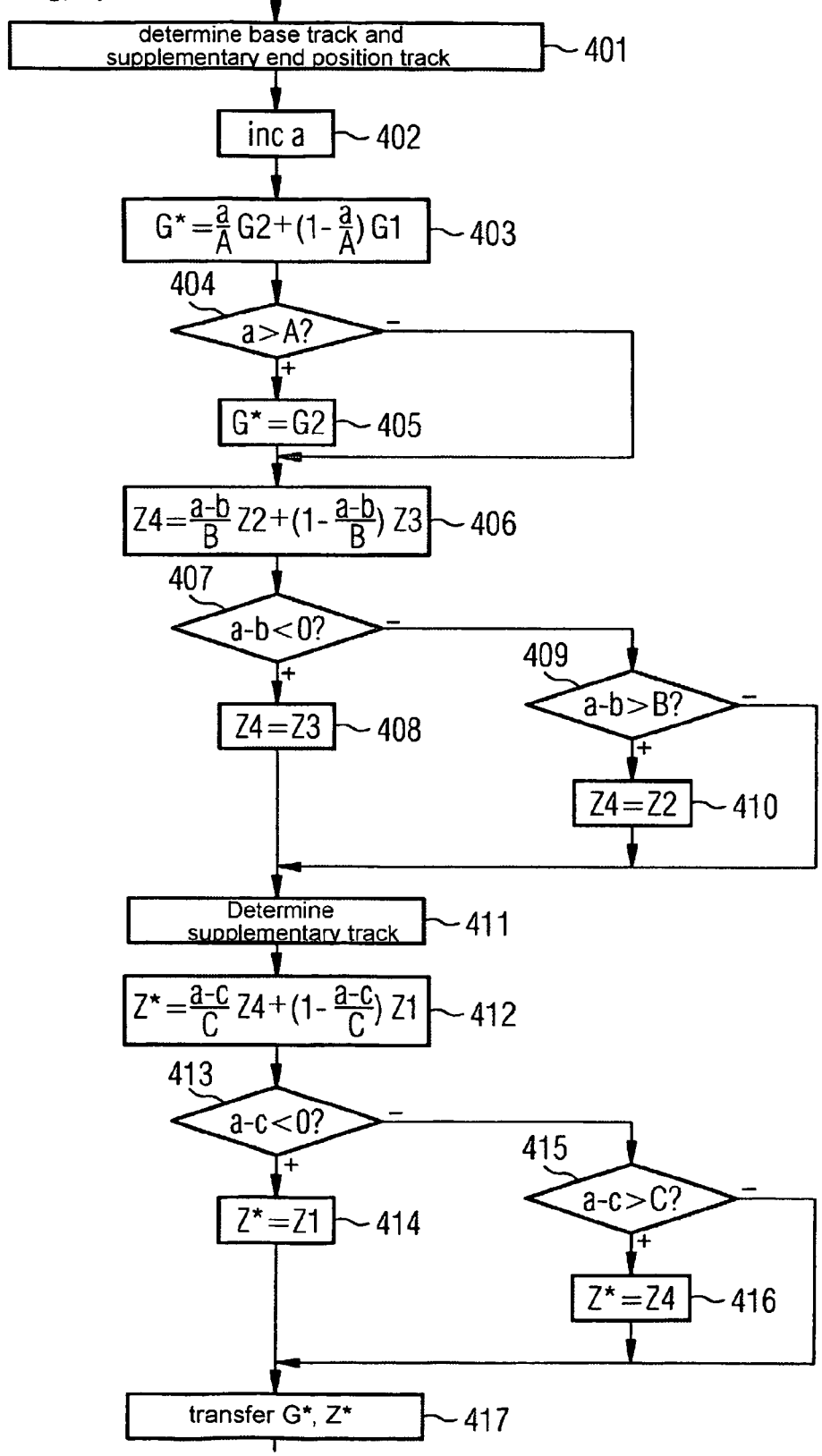

COMPUTER-SUPPORTED DETERMINATION METHOD FOR SUPPLEMENTARY POSITION SET VALUES FOR A POSITION GUIDED MOVING SUPPLEMENTARY ELEMENT OF A MACHINE IN PARTICULAR A PRODUCTION MACHINE

CROSS REFERENCE TO RELATED APPLICATIONS

This application is the US National Stage of International Application No. PCT/EP2005/052293, filed May 18, 2005 and claims the benefit thereof. The International Application claims the benefits of German application No. 102004025416.8 DE filed May 24, 2004, both of the applications are incorporated by reference herein in their entirety.

FIELD OF INVENTION

The present invention relates to a computer-supported determination method for supplementary position set values for a position guided moving supplementary element of a machine, in particular a production machine, which also features a position guided moving base element.
  with the computer determining, in accordance with a predetermined base track in space, a base position set value, so that when the base position set value is specified to the base element, the latter would be moved along the base track in a position-guided manner from a base start position to a base end position,
  with the computer also determining in each case a supplementary position set value for the supplementary element, so that when the supplementary position set value is specified to the supplementary element, the latter would be moved in a position-guided manner.

BACKGROUND OF INVENTION

These types of methods are generally known for machines with a number of position-guided elements, especially machine tools.

For machines other than machine tools, especially for production machines, other procedures are generally adopted. However numerous position-guided moving elements are present in these machines too. The movements of the individual elements are however only roughly synchronized with each other in these types of machine. This is explained in greater detail below using a plastic injection molding machine as an example.

Plastic injection molding machines have a multipart—as a rule two-part—tool form. One part of the tool is arranged statically on a chassis unit of the injection molding machine and the other part moves in relation to the chassis unit.

Once a plastic part has been injection molded, the tool mold is opened, meaning that the moving part of the tool is moved from the closed position to the open position. The injection-molded plastic part in this case is generally held in the moving part of the tool.

After the opening position is reached a handling device is moved from a rest position into a removal position, in which the handling device can remove the injection-molded plastic part from the moving tool part. Afterwards the handling device is moved back into its rest position. The moving tool part stays in its opening position in this case until the handling device has reached its rest position. Only then does the moving tool part move into its closed position again, so that the next injection molding process can begin.

The movement of the handling device and the movement of the moving tool part must obviously be coordinated with one another, so that no collisions can occur between the moving tool part and the handling device. In the prior art this is ensured by using end position switches to only enable the handling device to be moved from the rest position into the removal position once the moving tool part has reached its open position. Likewise the movement of the tool part back into its closed position is only enabled once the handling device has reached its rest position.

Although the prior art method securely guarantees that no collisions can occur, because of the movement-related delay time it often provides less than optimum dynamics and thereby an associated less than optimum machine productivity. It is thus desirable for the moving tool part and the handling device to determine the corresponding sequences of position set values, so that the moving tool part and the handling device can be moved simultaneously. In such cases, there must still be a guarantee that any collisions will be prevented.

It would be possible for a programmer to determine the supplementary position set values for the moving tool part and the handling device in such a way that the two elements are moved simultaneously and in this case the freedom from collisions is still guaranteed. However significant intellectual effort would be involved in such cases.

The object of the present invention is thus to achieve this type of simultaneous mobility of handling device and moving tool part—or in more general terms of a base element and a supplementary element—without having to make the effort of programming the two movements.

SUMMARY OF INVENTION

The object is achieved by the computer-supported determination method such that
  the computer determines, on the basis of the base set value determined, a corresponding instantaneous supplementary end position in space,
  the computer, on the basis of a predetermined fixed supplementary start position in space and the instantaneous supplementary end position, determines a supplementary position set value in each case, so that on specification of the supplementary position set value to the supplementary element, the latter, starting from the supplementary start position, would be moved in a position-guided manner along an instantaneous supplementary track to the instantaneous supplementary end point.

Furthermore the object is achieved by a data medium with a determination program stored on the data medium for executing such a determination method.

Furthermore the object is also achieved by a computer which features a program memory, in which such a determination program is stored, so that the computer executes such a determination procedure when the determination program is called.

The computer-supported determination method can be executed either online or offline.

With off-line execution the object is achieved by a data medium with a stored sequence of base position set values and a corresponding sequence of supplementary position set values for the control device, with the sequence of supplementary position set values having been determined in accordance with such a determination method.

With online execution the object is also achieved by a method of operation for such a machine, in which the control device includes a computer, which executes such a determination method online, and in which the control device specifies to the base element the base position set values determined and to the supplementary element the supplementary position set values determined, so that the base element is moved in accordance with the base position set values determined and the supplementary element is moved in accordance with the supplementary position set values determined in a position-guided manner.

Here too the object is further achieved by a data medium with an operating program stored on the data medium to execute such a method of operation, a corresponding programmed control device and a machine which features the correspondingly programmed control device.

The relevant supplementary position set values can for example be determined such that the computer initially determines the instantaneous supplementary track on the basis of the predetermined fixed supplementary start position and the instantaneous supplementary end position and then determines the supplementary position set value.

Preferably the supplementary end positions in the space lie on a predetermined supplementary end position track. Furthermore in this case the respective supplementary end position is located, relative to supplementary end position track, at least in a partial area of the supplementary end position track in a linear relationship to the relevant base position set value, relative to the base track. This is because this makes it particularly easy to determine the instantaneous supplementary end position.

Preferably the supplementary position set value, relative to the instantaneous supplementary track is further located at least in a partial area of the instantaneous supplementary track in a linear relationship to the relevant base position set value, relative to the base track. This is because this also makes the determination of the relevant supplementary position set value especially simple.

The determination of the instantaneous supplementary track in the space is arranged very simply if the instantaneous supplementary tracks in the space in each case form a straight line from the supplementary start position to the instantaneous supplementary end position.

If the supplementary position set value is kept the same as the supplementary start position until the base position set value has reached a first base intermediate position, which, relative to the base track, lies between the base start position and the base end position, this provides an especially simple way of avoiding collisions.

Depending on the embodiment of the inventive determination method, the supplementary position set value can reach the instantaneous supplementary end position before, with or after the base end position is reached by the base position set value. Preferably however the supplementary position set value still changes even after the base position has been reached by the base position set value. This does not represent a conflict with any reaching of the instantaneous supplementary end position before or with the reaching of the base end position by the base position set value, since the instantaneous supplementary end position can continue to change even then.

The danger of collisions can be reduced even further, if the instantaneous supplementary end position is kept the same as an initial supplementary end position until the base position set value has reached a second base intermediate position, which, relative to the base track, lies between the base start position and the base end position.

The use of the inventive determination method is especially of advantage if the supplementary end position track and the base track have a common track section.

BRIEF DESCRIPTION OF THE DRAWINGS

Further advantages and details emerge from the subsequent description of an exemplary embodiment in conjunction with the drawings. The Figures show the following basic diagrams FIG. 1 a schematic diagram of a production machine, FIG. 2 a flowchart, FIG. 3 the relationship of different positions to each other, FIG. 4 a further flowchart, FIG. 5 a further relationship of different positions to each other and FIG. 6 a block diagram of a computer.

DETAILED DESCRIPTION OF INVENTION

Figure 5:
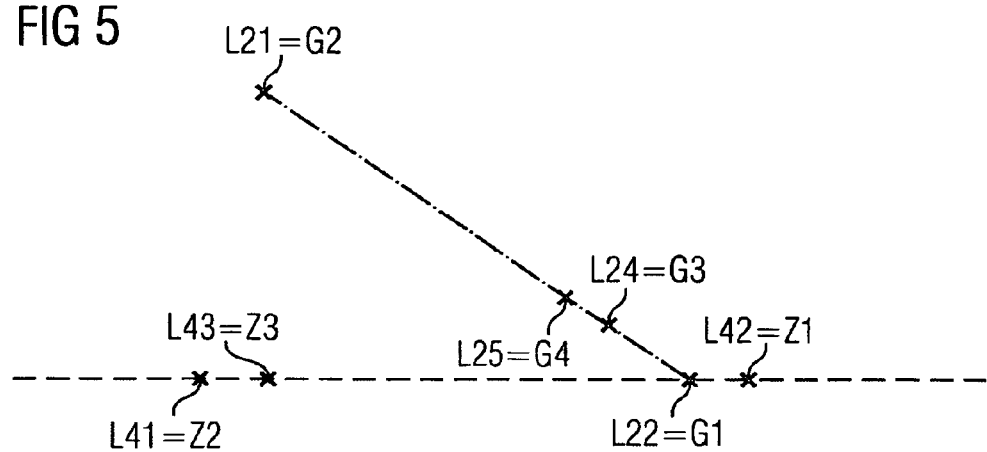

The present invention is explained below based on a typical production machine, namely an injection molding machine. However the present invention is not basically restricted to use in production machines or injection molding machines. Instead it is generally applicable to all types of machine which feature a position-guided moving base element and a position-guided moving supplementary element, with the movements of the base element and the supplementary element having to be coordinated with one another in order to avoid collisions.

In accordance with FIG. 1 a plastic injection molding machine includes a tool mold 1 and a handling device 2. The tool mold in this case features a stationary tool part 3 and a moving tool part 4.

The moving tool part 4 is able to be moved between a closed position and an open position. In the closed position of the moving tool part 4 the tool mold 1 is closed so that an injection-molded part can be manufactured by the injection molding machine. In the open position of the moving tool part 4 a manufactured injection molded part can be removed from the moving tool part 4 by the handling device 2. To this end the handling device is able to be moved in a position-guided manner between a rest position and a removal position.

In accordance with FIG. 1 the moving tool part 4 is in the closed position and the handling device 2 is in the rest position. Also shown by a dotted outlines however in FIG. 1 are the locations in which the moving tool part 4 is located in its open position and the handling device 2 in its removal position.

The overall injection molding machine is controlled by a control device 5. To this end an operating program 7 is stored in a program memory 6 of the control device 5. The operating program 7 has been supplied to the control device 5 beforehand in this case by means of a data medium 8 on which the operating program 7 is also stored. An example of such a data medium 8 is a CD-ROM 8. In principal the operating program 7 could also have been supplied to the control device 5 in another way, e.g. over a computer-to-computer connection not shown in the diagram for reasons of clarity.

The control behavior of the control device 5 is determined by the operating program 7 stored in the program memory 6. When the operating program 7 is called the control device 5 thus executes an operating method which is described below in conjunction with FIG. 2. For better understanding of the present invention only the parts of the operating method which are of significance for the present invention are discussed in greater detail below. In particular more detailed descriptions of the injection molding process as such and procedures for removing the injection molded part from the moving tool part 4 are not dealt with.

In accordance with FIG. 2, the control device 5 initially has a number of parameters specified to it—either within the framework of the application program 9 or directly by an operator 10—in it a step 201. These parameters in particular include the closed position and the open position of the moving tool part 4, subsequently designated as L41 and L42, as well as two intermediate positions lying between the two positions of the moving tool part 4, designated below as L43 and L44. Furthermore the parameters include the rest position and the removal position of the handling device 2, designated below as L21 and L22, as well as an initial fictitious removal position of the handling device 2, designated below as L23. As can be seen in FIG. 3, the positions L21 to L23 and L41 to L44, with the exception of position L21 lie on a straight line in this case.

In a step 202 the control device 5 then checks whether an injection molding process is completed. Step 202 is processed repeatedly in this case it necessary.

When the injection molding process is completed, the control device 5 defines in a step 203 the closing position L41 as base start position G1,
the opening position L42 as base end position G2,
the intermediate positions L43 and L44 as first and second base intermediate position G3 and G4,
the rest position L21 as supplementary start position Z1,
the final removal position L22 as the final supplementary end position Z2 and
the position L23 as the initial supplementary end position Z3.

This situation is also shown in FIG. 3. Furthermore, in step 203, it sets a runtime variable a to the value zero. The control device 5 then passes this data in a step 204 to a computer 11, which is implemented within the control device 5.

The computer 11 operates online. It initially determines—see FIG. 4—in a step 401a base track and a supplementary end position track. The base element is to be moved along the base track. The base track always leads in this case from the base start position G1 to the base end position G2. Because of the corresponding specification in the present case, the moving tool part 4 is the base element 4. The supplementary end position track is the track of the instantaneous supplementary end positions Z4 to be determined later. It leads from the initial supplementary end position Z3 to the final supplementary end position Z2.

In principle the base track can be determined in accordance with any given functionality. In the simplest case the base track in space however is a straight line from the base start position G1 to the base end position G2. The same then applies to the supplementary end position track.

Because of the type of determination of the base track and supplementary end position track, these feature a common track section. The common track section is first passed through by the base position set values G* and then by the instantaneous supplementary end position Z4, and this occurs in the same direction.

Next the computer 11 increments in a step 402 the runtime variable a. In a step 403 the computer 11 then determines the base position set value G*, to which the base element, in this case the moving tool part 4, is to be moved. The base position set value G* lies in this case on the base track.

In the selected example of the straight-line connection between the base start position G1 and the base end position G2, the base position set value G* can be determined for example in accordance with the formula specified in step 403. A in this case is a constant natural number, which is significantly greater than zero, e.g. lies between 100 and 10,000. It is however also possible to determine the set value in another way.

In a step 404 the computer 11 then checks whether the run time variable a is greater than the constant A. If it is, in a step 405 it limits the base position set value G* to the base end position G2.

Then the computer 11 determines in a step 406 the instantaneous supplementary end position Z4. In accordance with the example specified in conjunction with FIG. 4, the computer 1 specifies in this case as the instantaneous supplementary end position Z4 a point which lies on the supplementary end position track. b in this case is an offset. b is a natural number. B is again a constant which is of the same order of magnitude as the constant A. It does not have to be identical to this however. It should also be mentioned that here too another type of determination is possible.

Because the instantaneous supplementary end position Z4 is dependent on the run time variable a, the computer 11 determines the instantaneous supplementary end position Z4 implicitly on the basis of the base position set value G* determined in each case. Furthermore, because of this state of affairs, the instantaneous supplementary end positions Z4, relative to the supplementary end position track, at least in a partial area of the supplementary end position track, are in a linear relationship to the respective base position set value G*, relative to the base track.

In a step 407 the computer 11 checks whether the difference between the runtime variable a and the offset b is less then zero. If this is the case, the computer 11, in a step 408, sets the instantaneous intermediate end position Z4 to the value of the initial intermediate end position Z3. The offset b is thus determined so that the instantaneous supplementary end position Z4 is kept equal to the initial supplementary end position Z3 until the base position set value G* has reached the second base intermediate position G4.

If not, the computer 11 checks, in a step 409, whether the difference between runtime variable a and offset b is greater than the constant B. If this is the case, the computer 11, in a step 410 sets the instantaneous supplementary end position Z4 to the value of the final supplementary end position Z2.

Next the computer 11 determines, in a step 411 on the basis of the supplementary start position Z1 and the instantaneous supplementary end position Z4, an instantaneous supplementary track in space. In the simplest case the supplementary track is a straight line, extending from the supplementary start position Z1 to the instantaneous supplementary end position Z4. In principle however another supplementary track is also conceivable.

The computer 11 then determines, in a step 412, a supplementary set value Z* lying on the instantaneous supplementary track. In the simplest case the computer 11 determines the supplementary position set value Z* in such a case in accordance with the formula specified in step 412. c in this formula is again an offset which is a natural number. C is again a constant, lying in the same order of magnitude as the constants A and B, but not necessarily having the same value as one or both of these constants A, B.

As a result of the typically specified dependency of the supplementary position set value Z* on the runtime variable, the respective supplementary position set value Z* determined in this case, relative to the instantaneous supplementary track, lies at least in a partial area of instantaneous supplementary track in a linear relationship to the relevant base position set value G*, relative to the base track. Because of the offset c the supplementary position set value Z* continues to be kept equal to the supplementary start position Z1 until the base position set value G* has reached the first base intermediate position G3.

Depending on the choice of offset c and constants A and C the supplementary position set value Z* reaches the instantaneous supplementary end position Z4 before, with or after the base position set value G* has reached the base end position G2. Likewise, depending on the choice of offset b and constant A and B, the instantaneous supplementary end position Z4 reaches the final supplementary end position Z2 before, with or after the base position set value G* has reached the base end position G2. The offsets b and c and the constants B and C may however not be determined such that both the supplementary position set value Z* reaches the instantaneous supplementary end position Z4 and the instantaneous supplementary end position Z4 reaches the final supplementary end position Z2 before the base end position G2 is reached by the base position set value G*. The maximum permitted is that the value is reached simultaneously in both cases. Preferably the supplementary position set value Z* should even change after the base position set value G* has reached the base position set value G2.

The supplementary position set values G*, Z* determined are returned by the computer 11 to the control device 5 in a step 417. This device accepts the transferred supplementary position set values G*, Z* in a step 205. In a step 206 the control device 5 then outputs the base position set value G* to the moving tool part 4, the supplementary position set value Z* determined to the handling device 2. This causes the moving tool part 4 and the handling device 2 to be moved in a position-guided manner according to the required values G*, Z* determined. The moving tool part 4 is moved in this case along the base track from the base start position G1 for the base end position G2. The handling device 2 is moved starting from the supplementary start position Z1 to the instantaneous supplementary end position Z4.

In a step 207 the control device 5 then checks whether the base position set value G* is equal to the opening position of the moving tool part 4. If this is not the case, the sequence returns to the step 205. Else it checks, in a step 208, whether the supplementary position set value Z* has also reached the removal position of the handling device 2. If this is not the case, it returns to the step 205 again, else it continues the further processing of the operating program with a step 209.

In the step 209 the control device 5 controls the handling device 2 such that the handling device 2 removes the injection-molded plastic part from the moving tool part 4.

Next the handling device 2 must be moved back into its rest position, the moving tool part 4 into its closed position. To do this it is possible in principle to output the base and supplementary position set values G*, Z* in the reverse order again to the moving tool part 4 or the handling device 2. However the procedure explained in greater detail below in connection with FIG. 2 is also possible.

In accordance with FIG. 2, a number of initial parameters are namely again defined in a step 210. This is shown in FIG. 5. The positions L24 and L25 are in this case suitable specific positions of the handling device 2 on the supplementary track which leads from the removal position L22 to the rest position L21. Another value, e.g. the closing position L41, could also be selected as the supplementary end position Z3. As a result the handling device 2 is now the base element, the moving tool part 4 the supplementary element. In steps 211 to 213—in a similar way to steps 204 to 206—the computer 11 is called, the base and the supplementary position set value G* and Z* are accepted and also the supplementary position set values G*, Z* output to the handling device 2 and the moving tool part 4. By contrast with step 206 however, the base position set value G* is now specified to the handling device 2, the supplementary position set value Z* to the moving tool part 4.

In step 214 and 215 a check is performed as to whether the base position set value G* corresponds to the rest position of the handling device 2 and the supplementary position set value Z* to the closing position of the moving tool. Only when the two conditions are fulfilled is a transition to a step 216 undertaken, else the program returns to the step 212.

In the step 216 the control device 5 checks whether the further execution of the method of operation is to be ended. If this is not the case, the next injection molding process is initiated in a step 217 and the program returns to step 202. Else the method of operation is ended.

For the method explained above in connection with FIGS. 1 to 4 the control device 5 also specifies to the handling device 2 and the moving tool part 4 the base position set values G* determined and the supplementary position set values Z* determined. On the basis of these specifications the base element (e.g. the moving tool part 4) and the supplementary element (e.g. the handling device 2) is moved in a position-guided manner in accordance with the position set values G*, Z* determined and specified. The inventive determination method in this case is executed online by the computer 11.

Figure 6:
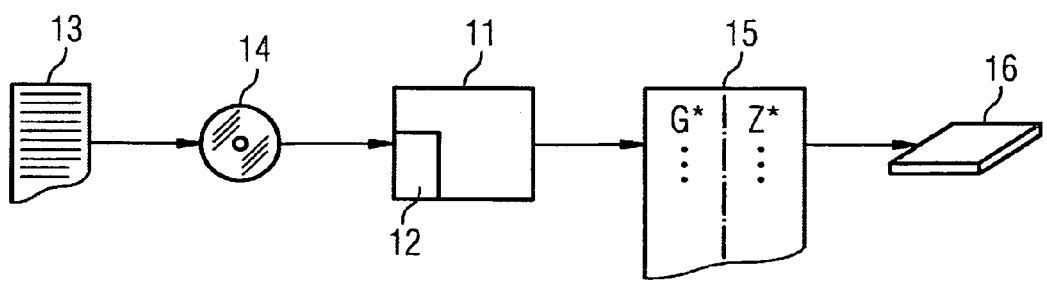

It is also possible however to determine the base and supplementary position set values G*, Z* in advance and offline. In this case the computer 11 itself features, in accordance with FIG. 6, a program memory 12 in which a determination program 13 is stored. The determination program 13 is this case is supplied to the computer 11 by means of a data medium 14 on which the determination program is also stored. An example of such a data medium 14 is again a CD-ROM 14. Supply via a computer-computer link would again also be possible.

When the determination program 13 is called, the computer 11 basically executes the same method as was described above in connection with FIG. 2 to 5. The steps 202, 209, 216 and 217 are omitted however. Instead of steps 204 to 206 and 211 to 213, steps 401 to 417 are executed.

Furthermore it must obviously be guaranteed that a correct assignment to the moving elements 2, 4 of the base and supplementary position set values G*, Z* determined is undertaken. To do this, the computer 11 preferably creates a control file 15, containing the sequence of base position set values G* and corresponding supplementary position set values Z*. The control file 15 can then again be stored on a suitable data medium 16, for example a memory card 16.

It is thus possible to guarantee in a simple manner, by means of the inventive determination or operation method, that the production machine can be operated on the one hand in a highly dynamic way but that collisions are still certain to be avoided.

The invention claimed is:

1. A method of controlling movement of a machine comprising a base element and a supplementary element, the method comprising:
    calculating a base position set value via a predetermined base track starting from a base start position and ending at a base end position;
    position controlling movement of the base element along the predetermined base track via the base position set value;
    determining a supplementary end position set value via the base position set value for the position controlled guided movement of the base element; and calculating a supplementary position set value via a predetermined supplementary start position and a current supplementary end position of the supplementary element such that the supplementary element is moved in a position controlled manner from the predetermined supplementary start position along a current supplementary track to the current supplementary end position.

2. The method as claimed in claim 1, wherein the current supplementary track is determined via the predetermined supplementary start position and the current supplementary end position, whereby the supplementary position set value is determined via the current supplementary track.

3. The method as claimed in claim 1, wherein the current supplementary end position lies on a predetermined supplementary end position track.

4. The method as claimed in claim 1, wherein the base position set value is located relative to the predetermined base track in a first ratio and the current supplementary end position is located relative to the current supplementary track in a second ratio such that the first and second ratios have at least a partial linear relationship during the movement of the machine.

5. The method as claimed in claim 2, wherein the base position set value is located relative to the predetermined base track in a first ratio and the current supplementary end position is located relative to the current supplementary track in a second ratio such that the first and second ratios have at least a partial linear relationship during the movement of the machine.

6. The method as claimed in claim 1, wherein the current supplementary track fog ins a straight line from the predetermined supplementary start position to the current supplementary end position.

7. The method as claimed in claim 1, wherein the supplementary position set value is the same as the predetermined supplementary start position until the base position set value reaches a first base intermediate position located between the base start position and the base end position.

8. The method as claimed in claim 1, wherein the supplementary position set value reaches the current supplementary end position before the base position set value reaches the base end position.

9. The method as claimed in claim 1, wherein the supplementary position set value reaches the current supplementary end position when the base position set value reaches the base end position.

10. The method as claimed in claim 1, wherein the supplementary position set value reaches the current supplementary end position after the base position set value reaches the base end position.

11. The method as claimed in claim 1, wherein the supplementary position set value continues to change after the base position set value reaches the base end position.

12. The method as claimed in claim 1, wherein the current supplementary end position is the same as an initial supplementary end position until the base position set value reaches a second base intermediate position located between the base start position and the base end position.

13. The method as claimed in claim 1, wherein the current supplementary track and the predetermined base track have a common track section.

14. A computer for controlling movement of a machine comprising a position-guided movable base element and a position-guided movable supplementary element, the computer comprising:
   an input device for inputting actual values;
   a program for calculating values to operate the machine based upon the actual values, the program performing the steps of:
      calculating a base position set value via a predetermined base track starting from a base start position and ending at a base end position,
      position controlling movement of the base element along the predetermined base track via the base position set value,
      determining a supplementary end position set value via the base position set value for the position controlled guided movement of the base element, and
      calculating a supplementary position set value via a predetermined supplementary start position and a current supplementary end position of the supplementary element such that the supplementary element is moved in a position controlled manner from the predetermined supplementary start position along a current supplementary track to the current supplementary end position; and
   an output device for controlling the movement of the machine based on the program.

* * * * *